US012578877B2

(12) United States Patent
Sawal et al.

(10) Patent No.: US 12,578,877 B2
(45) Date of Patent: Mar. 17, 2026

(54) STORING SENSITIVE DATA SECURELY IN A MULTI-CLOUD ENVIRONMENT

(71) Applicant: Dell Products L.P., Round Rock, TX (US)

(72) Inventors: Vinay Sawal, Fremont, CA (US); Ching-Yun Chao, Austin, TX (US); Anil Varkhedi, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 15 days.

(21) Appl. No.: 18/637,205

(22) Filed: Apr. 16, 2024

(65) Prior Publication Data

US 2025/0321682 A1    Oct. 16, 2025

(51) Int. Cl.
*G06F 3/06* (2006.01)
*G06F 21/62* (2013.01)

(52) U.S. Cl.
CPC .......... *G06F 3/0622* (2013.01); *G06F 3/0655* (2013.01); *G06F 3/067* (2013.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 2019/0370170 A1* | 12/2019 | Oltean | .................. | G06F 3/0652 |
| 2020/0019332 A1* | 1/2020 | Danilov | .............. | G06F 11/1076 |
| 2020/0136652 A1* | 4/2020 | Chen | .................. | H03M 13/373 |
| 2020/0201827 A1* | 6/2020 | Chacko | .............. | G06F 16/1824 |

OTHER PUBLICATIONS

R. Nivedhaa and J. J. Justus, "A Secure Erasure Cloud Storage System Using Advanced Encryption Standard Algorithm and Proxy Re-Encryption," 2018 International Conference on Communication and Signal Processing (ICCSP), Chennai, India, 2018, pp. 0755-0759, doi: 10.1109/ICCSP.2018.8524257. (Year: 2018).*

(Continued)

*Primary Examiner* — Edward J Dudek, Jr.
*Assistant Examiner* — Ralph A Verdermano, III
(74) *Attorney, Agent, or Firm* — Amin, Turocy & Watson, LLP

(57) ABSTRACT
Using reversible coding (e.g., linear network coding) to encode and partition sensitive data before storing the different encoded partitions in a distributed manner among different public cloud providers' storage systems is disclosed. The sensitive data is normally encrypted when first received, whereby the initial security is increased via the use of linear network coding. To retrieve the data, the encoded data parts are collected from among the disparate storages, and reconstituted, including via inverse encoding for returning to a client request. A proxy re-encryption service can further be leveraged to re-encrypt the encrypted data before or after encoding into the partitions. Data protection and availability can be integrated with the system by maintaining multiple redundant (e.g., differently encoded) copies of the encoded parts and/or recovery fragments among the various public cloud providers' storage systems.

20 Claims, 10 Drawing Sheets

(56) References Cited

OTHER PUBLICATIONS crypto.stackexchange.com, "Why is a proxy needed in proxy re-encryption?," [https://crypto.stackexchange.com/questions/63720/why-is-a-proxy-needed-in-proxy-re-encryption], Nov. 7, 2018, retrieved Feb. 7, 2024, 3 pages.

wikipedia.com, "Proxy re-encryption," [https://en.wikipedia.org/wiki/Proxy_re-encryption], retrieved Feb. 7, 2024, 3 pages.

crypto.stackexchange.com, "How proxy re-encryption works—layman perspective," [https://crypto.stackexchange.com/questions/99617/how-proxy-re-encryption-works-layman-perspective], Apr. 7, 2022, retrieved Feb. 7, 2024, 4 pages.

* cited by examiner begin

602 — RECEIVING SENSITIVE DATA

604 — ENCODING AND PARTITIONING THE SENSITIVE DATA, BASED ON NETWORK CODING THAT IS REVERSIBLE, INTO ENCODED PARTS

606 — STORING THE ENCODED PARTS, COMPRISING DISTRIBUTING THE ENCODED PARTS TO RESPECTIVE NETWORK EQUIPMENT OF DIFFERENT CLOUD SERVICE PROVIDERS FOR STORAGE.

end

STORING SENSITIVE DATA SECURELY IN A MULTI-CLOUD ENVIRONMENT

BACKGROUND

Existing storage systems that store highly-sensitive data such as electronic medical records systems are constantly under threat of data breaches. The problem is even more pronounced with respect to storage of such data in the public cloud. In the public cloud, the responsibility of protecting the data lies with the cloud user and not the cloud service provider. Compliance standards attempt to ensure that the protection is adequate, but they are more focused on monitoring and auditability.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
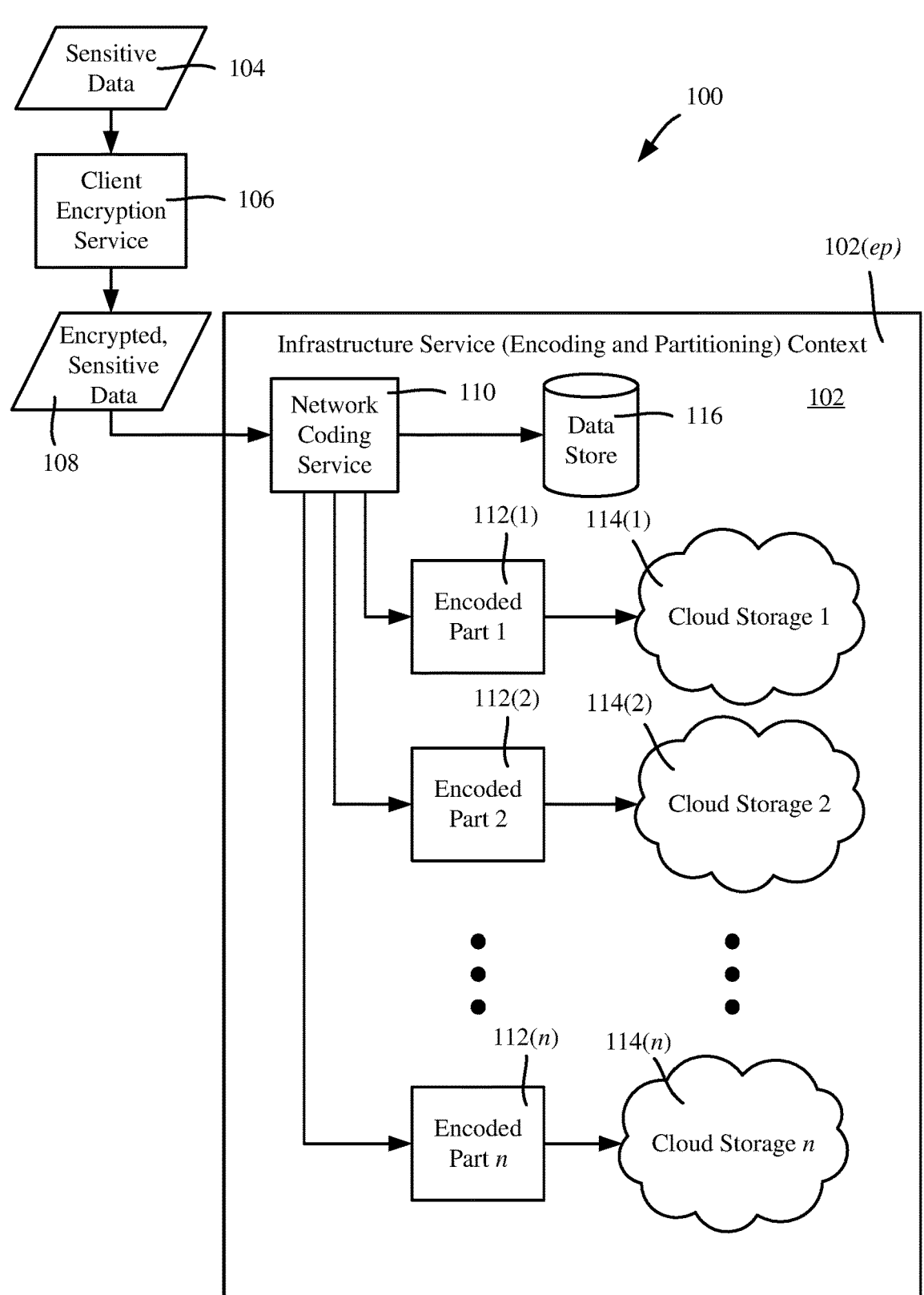
FIG. 1 is a block diagram showing an example portion of an infrastructure service that encodes and more securely stores sensitive data in encoded parts distributed among multiple cloud providers in a multi-cloud environment, in accordance with various embodiments and implementations of the subject disclosure.

Various aspects of the technology described herein are generally directed towards using layers of data protection to increase data security of sensitive data while providing data durability and availability via public cloud providers' storage systems. Instead of relying solely on classical cryptography based on using client keys to encrypt the data, reversible coding (e.g., linear network coding) encodes and partitions the sensitive data and stores the different encoded partitions distributed among different public cloud providers' storage systems. Typically, the sensitive data is encrypted when first received, (the normal practice for storing sensitive storage in the cloud), whereby the technology described herein facilitates a combination of classical cryptography with the security of data encoding, e.g., linear network coding.

The multiple-step data storage technique leverages multi-cloud environments to create an enhanced encryption solution, including client-side encryption of its sensitive data. A subsequent step achieves enhanced security when the encrypted, sensitive data reaches an infrastructure service as described herein, which uses encoding split and store copies of several parts in multiple disparate data stores, taking advantage of the availability of multiple data stores to the extent possible. To retrieve the data, the infrastructure service gathers the encoded data parts from among the disparate storages, and reconstitutes the encrypted data from the encoded data for returning to a client request.

In one example implementation, further protection is provided by using a proxy re-encryption service to secondarily encrypt the data encrypted under one key to being encrypted under another key, without the need to first decrypt and re-encrypt the data. This further preserves the confidentiality of the information.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

Figure 2:
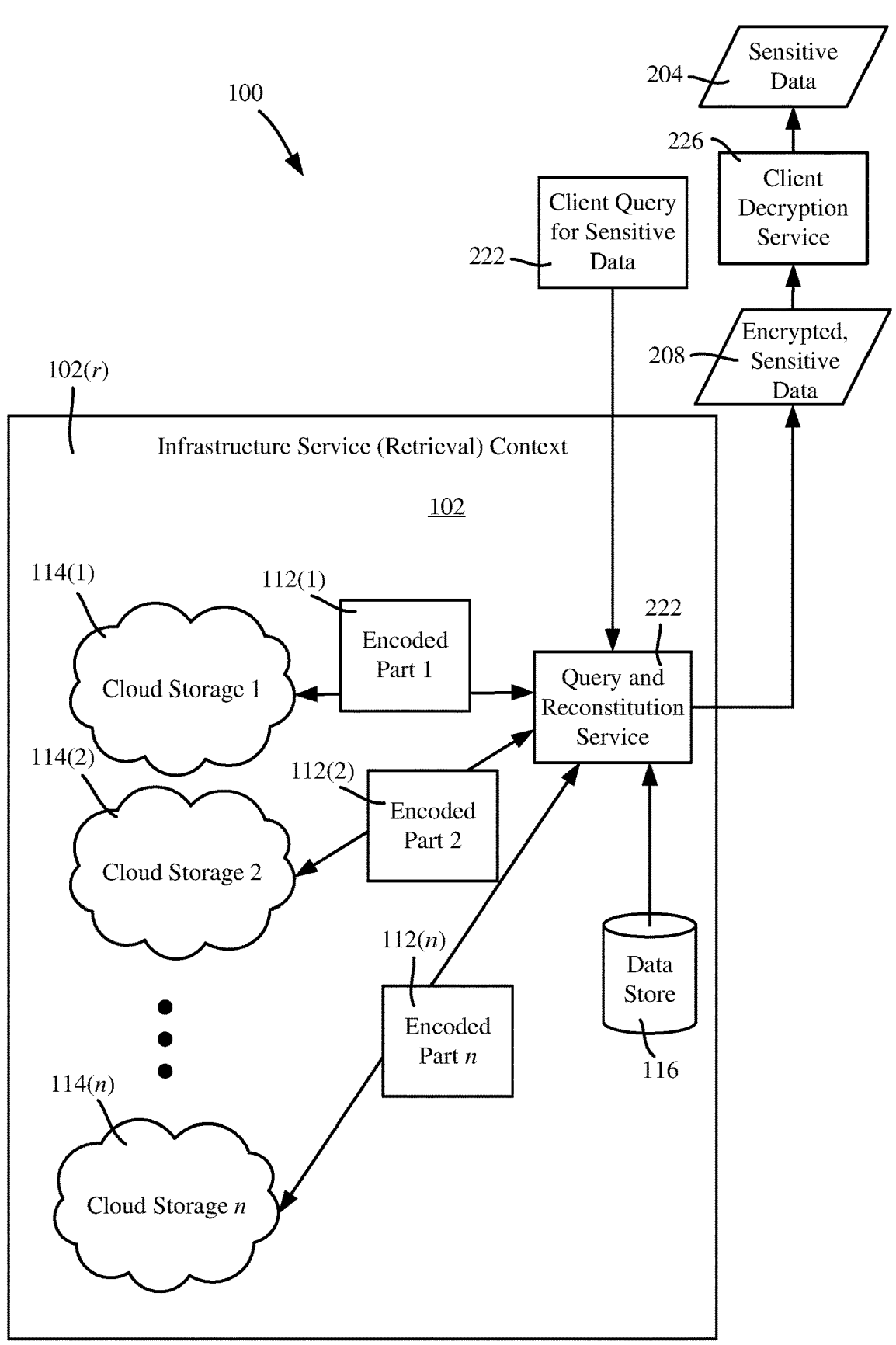
FIG. 2 is a block diagram showing an example portion of an infrastructure service that retrieves the encoded parts of the sensitive data from among the multiple cloud providers and reconstitutes the sensitive data from those encoded parts, in accordance with various embodiments and implementations of the subject disclosure.

FIGS. 1 and 2 show a generalized block diagram of an example system 100 including an encoding and partitioning portion 102(*ep*) (FIG. 1) of an infrastructure service (collectively 102), and a retrieval portion 102(*r*) of the infrastructure service 102 (FIG. 2). The infrastructure service 102 that can be offered "as a service" (e.g., offered as an infrastructure service provider to applications and platforms, such as, for example, providing the infrastructure service 102 to emergency medical record and/or financial storage services.

As described herein and depicted in FIG. 1, a client or the like sends sensitive data 104, typically via a client-side encryption service 106, to the infrastructure service 102. The encryption service 106 runs within the client (e.g., customer) context. When the client wants to utilize the secure storage service described herein, the client encrypts the data using their public key and uploads the data to the infrastructure service 102.

Thus, the infrastructure service 102 ordinarily receives the sensitive data as encrypted, sensitive data 108. The data can be in any suitable identifiable data structure, such as a file, group of files, block of storage, and so forth. Significantly, as will be understood, the infrastructure service 102 does not need to decrypt the encrypted, sensitive data 108 to further protect it as described herein.

As shown in FIG. 1, the encrypted, sensitive data 108 is received by a network coding service 110 that runs in the infrastructure service 102 and encodes and splits the original data (in this example the encrypted, sensitive data 108) into smaller parts. The network coding service 110 may use multiple coding algorithms to encode the original data into multiple redundant copies to be stored in the cloud, (as described with reference to FIG. 5). In any event, the network coding service 110 encodes and partitions the data into encoded parts shown in FIG. 1 as the encoded parts 112(1)-112(*n*). In one example implementation, linear network coding is used, (which is generally used for encoding and splitting wired/wireless communication data packets for transmission). With linear network coding, partitioning results from the encoding, however, it is feasible to further partition the encoded parts 112(1)-112(*n*), and/or possibly recombine some of them into a larger dataset prior to storage. Note that the technology described herein is not limited to linear network coding, and in general, any reversible coding technique can be used.

The network coding service distributes the encoded parts 112(1)-112(*n*) to various different public cloud service providers in a multi-cloud environment, represented by the cloud storages 114(1)-114(*n*). Note that the cloud storages are shown as being part of the infrastructure service 102, however this is only a virtual way to consider the infrastructure service 102 from an external client's perspective, as in reality the cloud storages 114(1)-114(*n*) are part of a multi-cloud environment comprised of separate public cloud service providers with their own infrastructures.

Further note that while FIG. 1 shows a one-to-one relationship between the encoded parts 112(1)-112(*n*) and the cloud storages 114(1)-114(*n*), there can be many other ways for distributing the encoded parts. For example, five encoded parts can be distributed to two different cloud storages, and so on, generally such that no one cloud storage provider contains enough parts to reassemble the encrypted data, even if the client's decryption key has been compromised. It is also feasible to have separate accounts with the same public cloud service provider, with separate encoded parts of the encrypted, sensitive data 108 stored under the separate accounts, such that if any account is compromised, there will not be enough encoded parts in that account to recreate the encrypted data. Other distribution techniques are feasible, including having some of the encoded parts maintained in a private cloud storage system.

As shown in FIG. 1, the network coding service maintains metadata that relates the encrypted, sensitive data 108 to the encoded parts 112(1)-112(*n*) and their respective locations, e.g., in a highly-reliable, highly-available and highly-secure data store 116. This allows the encoded parts 112(1)-112(*n*) associated with the encrypted, sensitive data 108 to be retrieved and reconstituted, as described with reference to FIG. 2.

More particularly, in FIG. 2 an example implementation of the retrieval portion 102(*r*) of the infrastructure service 102 is shown. When the client queries (block 220) for the corresponding data, e.g., a file, a query (handling) service and reconstitution service 222 performs a number of functions in response to the request; (note that alternatively, a separate query handler service and reconstitution service can work together). Such functions include accessing the data store 116 to locate and retrieve the relevant encoded parts 112(1)-112(*n*) from the various cloud storages 114(1)-114 (*n*). Once retrieved, the query and reconstitution service 222 reconstructs (reconstitutes) the encrypted, sensitive data 108 (e.g., the requested file) by reorganizing the encoded parts 112(1)-112(*n*) into their correct relative places. If a data handling scheme such as erasure coding is used, part of reconstituting the encrypted, sensitive data 108 can include logically combining the correct sets of encoded parts 112(1)-112(*n*) to obtain the original encrypted, sensitive data 108.

Once the encoded parts 112(1)-112(*n*) are correctly reorganized, the query and reconstitution service 222 runs the parts through a reverse (e.g., inverse linear network) coding function to reconstitute a copy/instance 208 (of the original of the encrypted, sensitive data 108 as originally received by the infrastructure service 102). The query and reconstitution service 222 returns the encrypted, sensitive data 208 to the client.

A client-side decryption service 226 runs in the client context. Once the client obtains the encrypted, sensitive data instance 208, the client uses their private key (instead of the sender's private key) to decrypt the data, resulting in an instance/copy 204 of the original sensitive data 206. As seen from this technique, no key exchange happens between the sender and the receiver. Data is stored securely without the service provider's keys.

Figure 3:
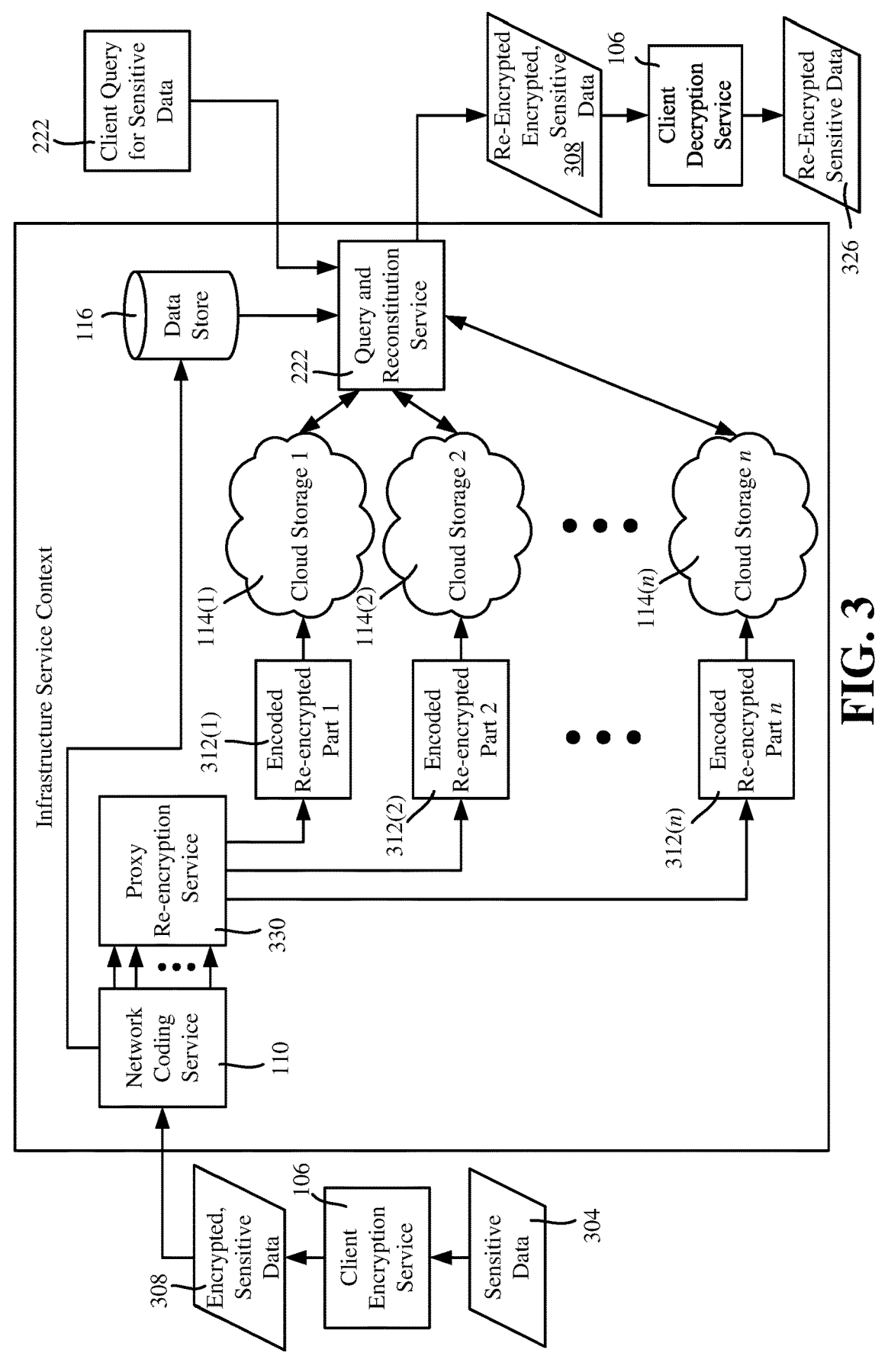
FIG. 3 is a block diagram showing an infrastructure service that encodes, re-encrypts and more securely stores sensitive data in encoded, re-encrypted parts distributed among multiple cloud providers in a multi-cloud environment for subsequent retrieval, in accordance with various embodiments and implementations of the subject disclosure.

Turning to another example implementation, FIG. 3 shows a similar end-to-end infrastructure service 302 that further includes a (e.g., third party) proxy re-encryption service 330. The proxy re-encryption service 330 is responsible for converting the cipher text 308 generated by the sender's public key into a form that can be decrypted by the receiver's private key without the need to use the sender's private key. In general, the proxy performs a transformation on encrypted data without having access to the plaintext, thereby preserving the confidentiality of the information, which places little trust in and reveals only needed information to the proxy. Various algorithms can be used to provide proxy re-encryption services including, but not limited to, partial homomorphic encryption or RSA encryption.

Thus, as in FIG. 1, a client's sensitive data 304 is encrypted by the client-side encryption service 106 whereby encrypted, sensitive data 308 is received by the network coding service 110. The network coding service 110 operates as in FIG. 1, except that instead of storing the encoded parts directly, the network coding service 110 works with the proxy re-encryption service 330 to re-encrypt the data, resulting in encoded re-encrypted data parts 312(1)-312(*n*) being distributed to the cloud storages 114(1)-114(*n*). In general, the proxy re-encryption service 330 transforms the encrypted data into another form. A significant property of this newly transformed data is that it can be decrypted with the receiver's private key; the sender's private key is not required to decrypt the data. for example, the partial homomorphic encryption method can be used by the proxy re-encryption service 330 to accomplish this task.

Note that although not explicitly shown in FIG. 1, it is understood that the proxy re-encryption service 330 can return the re-encrypted data parts 312(1)-312(*n*) to the network coding service 110, which in turn can then distribute the re-encrypted data parts 312(1)-312(*n*) among the cloud storages 114(1)-114(*n*). It is also feasible for the network coding service 110 to have the full block of encrypted, sensitive data 308 re-encrypted by the proxy re-encryption service 330 as a whole, and then encode the re-encrypted whole into the re-encrypted data parts 312(1)-312(*n*).

In any event, the query and query and reconstitution service 222 works as in FIG. 2, and as such, is not described herein for purposes of brevity. Note however that the reconstituted data is the re-encrypted encrypted, sensitive data, with the re-encrypted state of the data remaining when returned to the client. This allows the client control over the original data. For example, the client can decrypt all of it, but another recipient can decode only the portion or portions of the data the client allows.

By way of example, consider that the data corresponds to confidential medical records. These records contain valuable information to researchers, so, via the proxy re-encryption, the client can use proxy keys that allow to access to portions of the data records to researchers that contain useful information without revealing any patient data. Similarly, an enterprise's confidential financial records can be partially accessed only to the extent needed for a department's function, e.g., some portion the payroll department is authorized to access, another portion authorized to the finance department, yet another portion to accounting, and so on.

Note that if the infrastructure service 102 handles different type of data in different ways, e.g., highly-sensitive data is extra protected using the proxy re-encryption service in conjunction with encoding and distributed storage, normally sensitive data is protected with encoding and distributed storage (but not via proxy re-encryption), and ordinary data is stored in encrypted form only, the client instructs the infrastructure service 102 as to how to handle a dataset to be stored. For example, different types of data can be identified (e.g., flagged) differently, different interfaces can be made available for receiving the different types of data, and/or the like.

Figure 4:
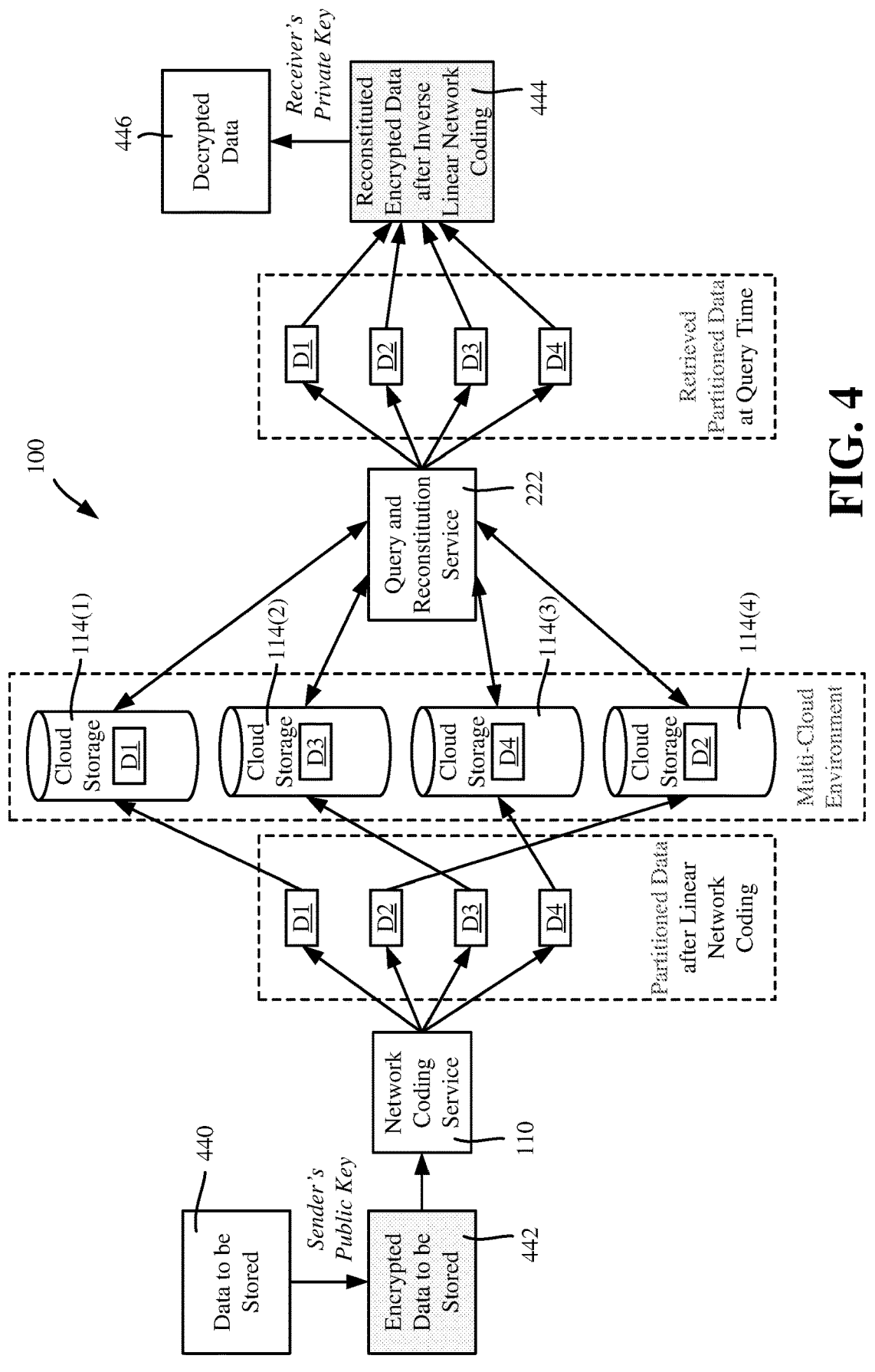
FIG. 4 is a block diagram showing an example of how the infrastructure service that encodes data into fragments that are distributed among multiple cloud providers in a multi-cloud environment for subsequent retrieval and reconstituting of those fragments, in accordance with various embodiments and implementations of the subject disclosure.

FIG. 4 shows example data flow to and from the system 100, e.g., as a sequence of typical data flow operations. A sender wants to store some sensitive information 440 securely in the cloud. The sender has a public/private key-pair. The sender encrypts the data using their public key, and sends the encrypted data 442 to the network coding service 110 (e.g., if the infrastructure service 102 of FIGS. 1-3), which can be part of a cloud service provider, for storage. The network coding service 110 splits the encrypted data, e.g., using linear network coding, to generate new data parts D1-D4. The new data may be sent to a proxy re-encryption service as described with reference to FIG. 3, although this is not explicitly shown in FIG. 4.

The data parts D1-D4 are now stored in a distributed manner in the cloud storages, e.g., 114(1)-114(4). Note that the Cloud Storage provider has no knowledge of the data because the network coding service is not using the sender's or the proxy's keys for encryption.

When a receiver entity is interested in retrieving the data, the receiver makes a request to the query and reconstitution service 222 of the infrastructure service for the data. as in FIG. 2 or 3, the query and reconstitution service 222 collects the distributed parts D1-D4 and runs them through an inverse (e.g., linear network) coding process to reconstitute the original encrypted data. The query and reconstitution service 222 sends the data to the receiver entity, which uses their own private key to decrypt the cyphertext (block 444) and extracts a reconstituted decrypted copy 446 of the original data 440.

Figure 5:
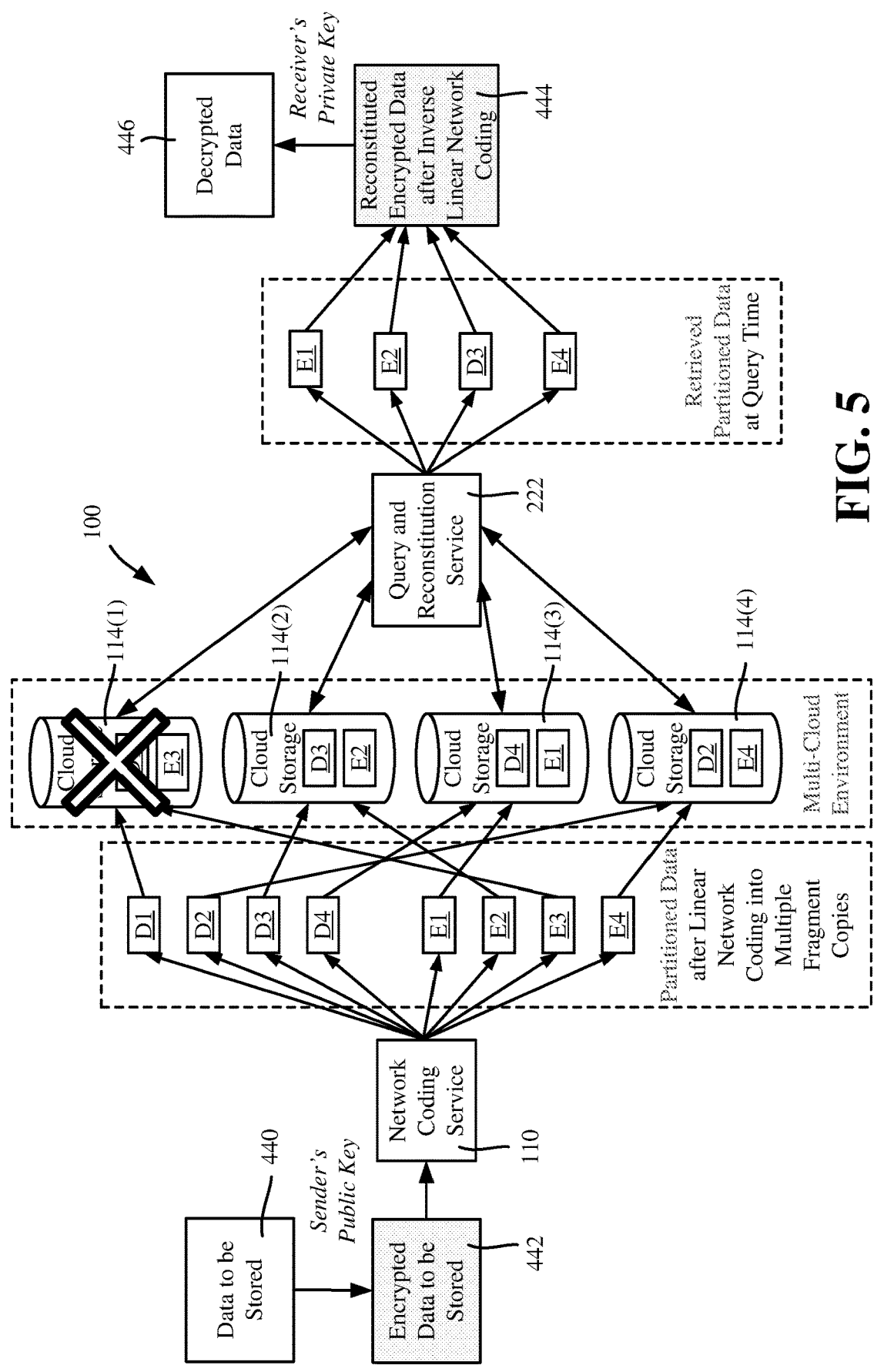
FIG. 5 is a block diagram showing an example of how the infrastructure service that encodes data into recovery groups of multiple fragments that are separated into storage groupings distributed among multiple cloud providers in a multi-cloud environment for subsequent retrieval and reconstitution, in accordance with various embodiments and implementations of the subject disclosure.

FIG. 5 is similar to FIG. 4, except that data resiliency is achieved by creating multiple copies of the data, e.g., utilizing multiple linear network coding algorithms to encode the data copies. The partitioned data, shown in FIG. 5 as D1-D4 and E1-E4, can be considered recovery groups (D1, E1), (D2, E2), (D3, E3) and (D4, E4), which can be stored in various datacenters across multiple availability zones, for example. In the event of a datacenter failure, there are enough copies of the data available in other datacenters so the data can be reconstituted using fragments available in other datacenters.

For security and data resiliency, the recovery groups are separated into storage groupings that ensure that the encoded copies of any recovery group are not stored only to the same cloud storage. For example, FIG. 5 shows storage groupings of (D1, E3), (D3, E2), (D4, E1) and (D2, E4) that are distributed among the cloud storages 114(1)-114(4) or other storage entities. If, as in FIG. 1 the cloud storage fails, (e.g., D1 and E3 are not available, that is, are missing fragments), the query and reconstitution service 222, seeking E1-E4, can obtain D3 instead of E3 from the cloud storage 114(2), inverse encode D3, and combine the results with the inverse encoding results of E1, E2 and D4 to reconstitute the full set of data. As can be seen, creating redundant copies increases durability and availability of data in the event of network failure or storage node failure. Note that while redundancy via multiple copies is described in the example of FIG. 5, it is understood that data protection schemes such as erasure coding can be used instead of or in addition to redundancy via multiple copies to ensure data protection and availability.

Figure 6:
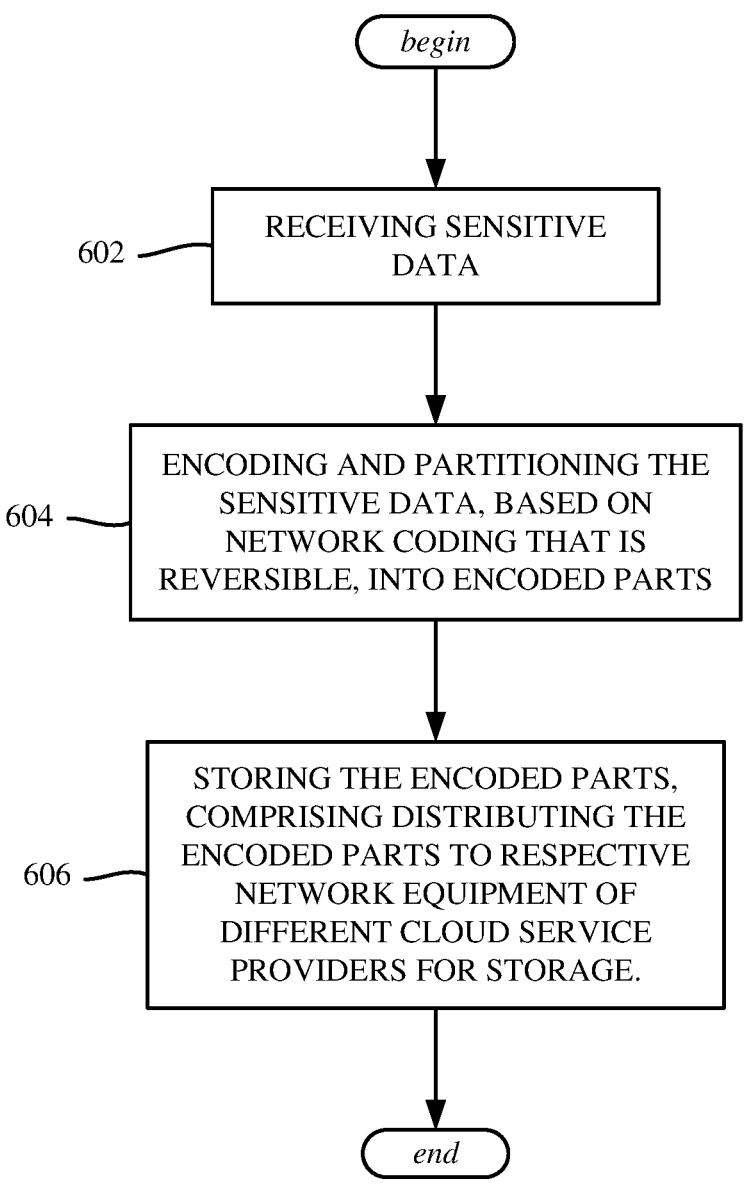
FIG. 6 is a flow diagram showing example operations related to encoding and partitioning the sensitive data, based on network coding that is reversible, into encoded parts and storing the encoded parts, by distributing the encoded parts different cloud service providers for storage, in accordance with various embodiments and implementations of the subject disclosure.

One or more concepts described herein can be embodied in a system, such as represented in the example operations of FIG. 6, and for example can include a memory that stores computer executable components and/or operations, and at least one processor that executes computer executable components and/or operations stored in the memory. Example operations can include operation 602, which represents receiving sensitive data. Example operation 604 represents encoding and partitioning the sensitive data, based on network coding that is reversible, into encoded parts. Example operation 606 represents storing the encoded parts, comprising distributing the encoded parts to respective network equipment of different cloud service providers for storage.

The encoded parts can be respective encoded parts, and storing the encoded parts can include distributing the respective encoded parts to the respective network equipment of the different cloud service providers.

Further operations can include receiving a query for the sensitive data from another system, and, in response to receiving the query, obtaining the encoded parts from the respective network equipment of the different cloud service providers, performing inverse network coding on the different encoded parts to obtain reconstituted sensitive data, and returning the reconstituted sensitive data to the other system.

The sensitive data can be received as encrypted data.

The sensitive data can include at least one of: medical information or financial information.

Encoding and partitioning the sensitive data can include encoding the sensitive data into recovery groups of multiple fragments, in which one fragment of a recovery group is usable to recover another fragment of the recovery group, and storing the encoded parts can include distributing the multiple fragments to the respective network equipment of the different cloud service providers for storage.

The recovery groups of the multiple fragments can include at least one of: redundant fragments, or erasure coding fragments.

Further operations further can include separating the fragments of each recovery group into multiple storage groupings, in which each storage grouping contains at least one fragment from each of at least two distinct recovery groups, and distributing the multiple fragments can include distributing the multiple storage groupings to the respective network equipment of the different cloud service providers for storage.

Further operations can include receiving a query for the sensitive data, and, in response to receiving the query, attempting to obtain the encoded parts based on the fragments in the multiple storage groupings, determining that one of the multiple storage groupings is unavailable from first network equipment of a first cloud service provider of the respective network equipment of the different cloud service providers, resulting in a missing fragment, and, in response to the determining that one of the storage groupings is unavailable, recovering the missing fragment from a storage grouping of second network equipment of a second cloud service provider of the respective network equipment of the different cloud service providers from which the missing fragment is recoverable.

Further operations can include re-encrypting the sensitive data via a proxy re-encryption service prior to the encoding and the partitioning of the sensitive data. Further operations can include re-encrypting the encoded parts into re-encrypted encoded parts via a proxy re-encryption service prior to storing the re-encrypted encoded parts as the encoded parts.

Further operations can include receiving a query for the sensitive data, and in response to receiving the query, obtaining the encoded parts from the respective network equipment of the different cloud service providers, performing inverse network coding on the different encoded parts to obtain reconstituted and re-encrypted data, and returning the reconstituted re-encrypted data as the sensitive data.

Figure 7:
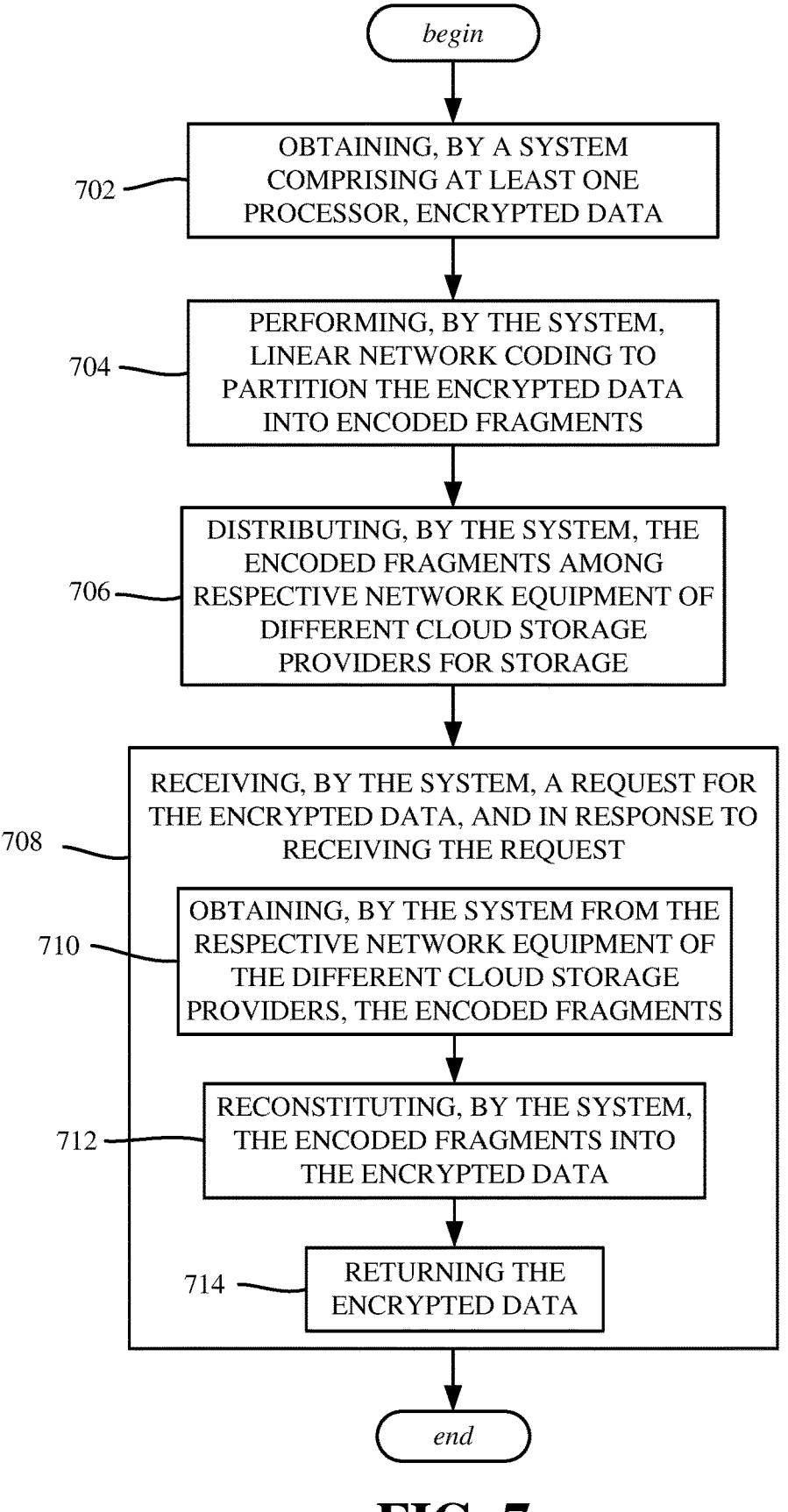
FIG. 7 is a flow diagram showing example operations related to performing reversible coding to partition encrypted data into encoded fragments, distributing the encoded fragments among different cloud storage providers for storage, reconstituting, the encoded fragments into the encrypted data and returning the encrypted data, in accordance with various embodiments and implementations of the subject disclosure.

One or more example embodiments, such as corresponding to example operations of a method, are represented in FIG. 7. Example operation 702 represents obtaining, by a system comprising at least one processor, encrypted data. Example operation 704 represents performing, by the system, linear network coding to partition the encrypted data into encoded fragments. Example operation 706 represents distributing, by the system, the encoded fragments among respective network equipment of different cloud storage providers for storage. Example operation 708 represents receiving, by the system, a request for the encrypted data, and in response to receiving the request, performing example operations 710, 712 and 714. Example operation 710 represents obtaining, by the system from the respective network equipment of the different cloud storage providers, the encoded fragments. Example operation 712 represents reconstituting, by the system, the encoded fragments into the encrypted data. Example operation 714 represents returning the encrypted data.

The encoded fragments can be re-encrypted by a proxy re-encryption service as re-encrypted encoded fragments, reconstituting the encoded fragments into the encrypted data can include reconstituting the re-encrypted encoded fragments into the encrypted data as re-encrypted encrypted data for returning in response to receiving the request.

The encoded fragments can include recovery groups including a first fragment and a second fragment; the first fragment can be recoverable from the second fragment, and distributing the encoded fragments can include separating the first fragment from the second fragment to send the first fragment to first network equipment of a first cloud storage provider for storage, and to send the second fragment to second network equipment of a second cloud storage provider, that is different from the first network equipment of the first cloud storage provider, for storage. Reconstituting the encoded fragments into the encrypted data can include recovering the first fragment from the second fragment.

Figure 8:
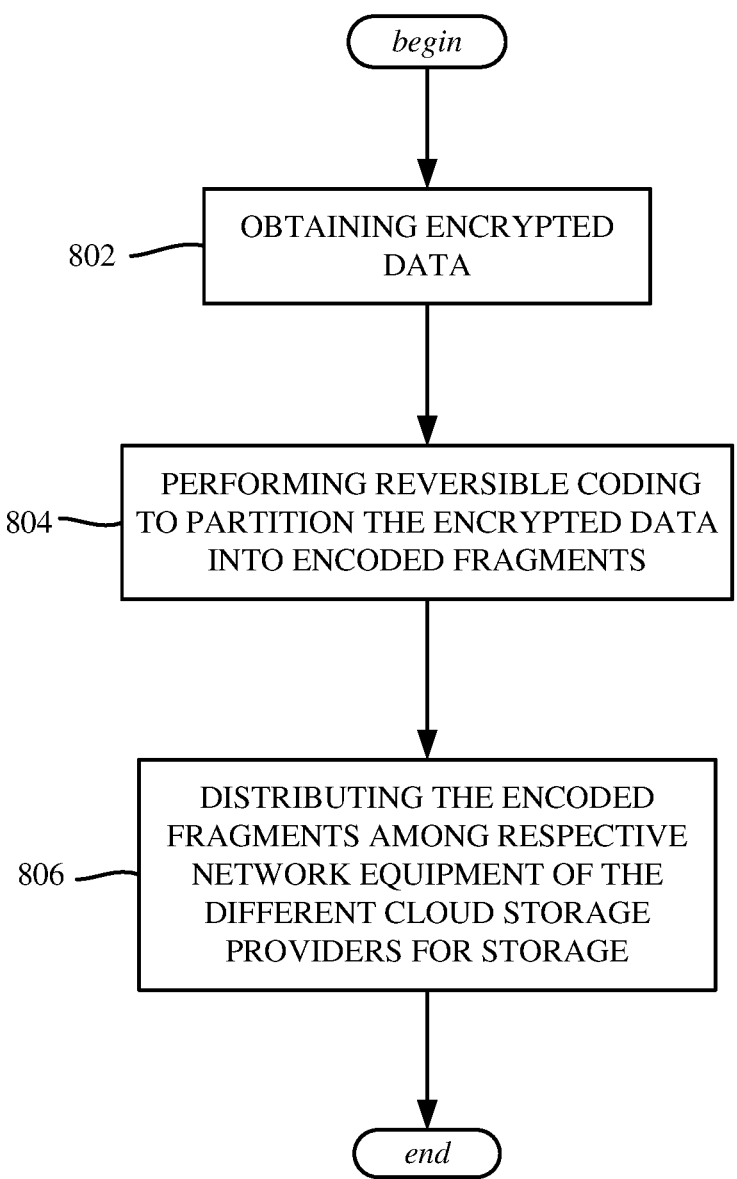
FIG. 8 is a flow diagram showing example operations related to performing reversible coding to partition encrypted data into encoded fragments, and distributing the encoded fragments among different cloud storage providers for storage, in accordance with various embodiments and implementations of the subject disclosure.

FIG. 8 summarizes various example operations, e.g., corresponding to a machine-readable medium, comprising executable instructions that, when executed by a processor, facilitate performance of operations. Example operation 802 represents obtaining encrypted data. Example operation 804 represents performing reversible coding to partition the encrypted data into encoded fragments. Example operation 806 represents distributing the encoded fragments among respective network equipment of the different cloud storage providers for storage.

The encoded fragments can be re-encrypted by a proxy re-encryption service as re-encrypted encoded fragments, and reconstituting of the encoded fragments into the encrypted data can include reconstituting the re-encrypted encoded fragments into the encrypted data as re-encrypted encrypted data for returning in response to a request.

Further operations can include receiving a request for the encrypted data, and, in response to the request, obtaining, from the respective network equipment of the different cloud storage providers, the encoded fragments, reconstituting the encoded fragments into the encrypted data, and returning the encrypted data.

The encoded fragments can include recovery groups comprising a first fragment and a second fragment, the first fragment can be recoverable based on the second fragment, distributing the encoded fragments can include separating the first fragment from the second fragment to send the first fragment to first network equipment of a first cloud storage provider for storage, and to send the second fragment to second network equipment of a second cloud storage provider, that is different from the first cloud storage provider, for storage; reconstituting the encoded fragments into the encrypted data can include recovering the first fragment based on the second fragment.

As can be seen, the technology described herein facilitates combining linear network coding in addition to traditional cryptographic techniques to provide enhanced security. The use of multiple data stores and distributed data storage techniques enhance data security while improving reliability and availability. A proxy re-encryption service can also be leveraged to provide further benefits.

Figure 9:
FIG. 9 is a block diagram representing an example computing environment into which embodiments of the subject matter described herein may be incorporated.
Figure 9:
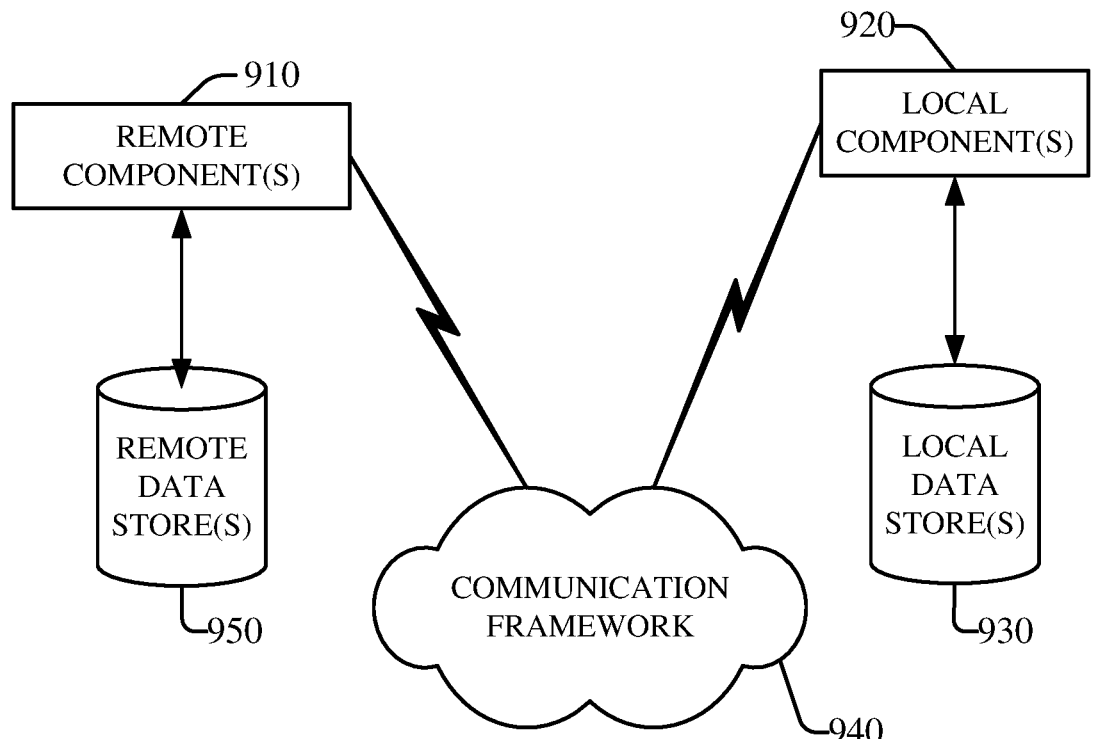

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
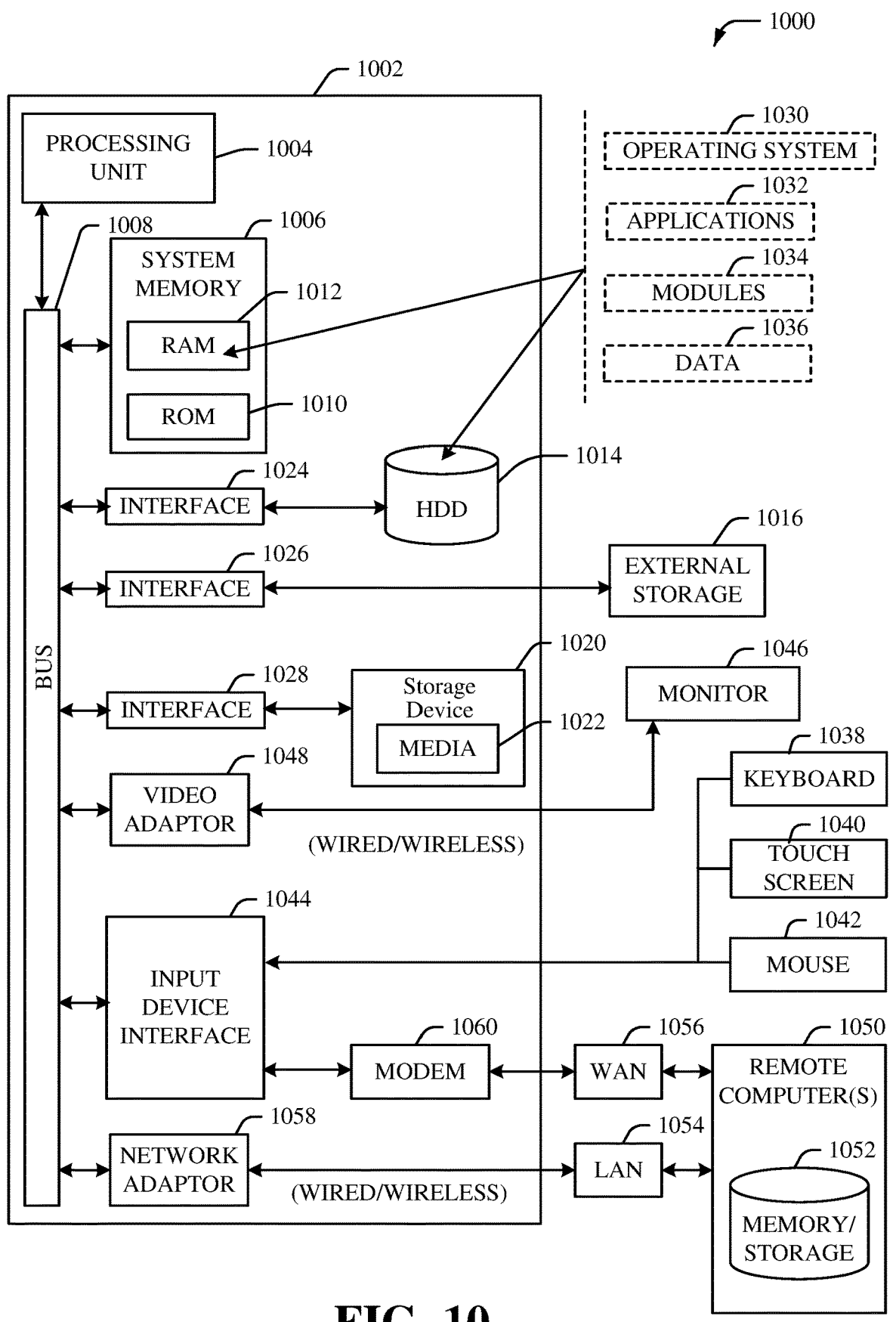
FIG. 10 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (virtual machine) of multiple virtual machines hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

one or more processors; and one or more memories that store executable instructions that, when executed by the one or more processors, facilitate performance of operations, the operations comprising:

receiving sensitive data;

encoding and partitioning the sensitive data, based on network coding that is reversible, into encoded parts; and storing the encoded parts, comprising distributing the encoded parts to respective network equipment of different cloud service providers for storage, wherein the distributing of the encoded parts ensures that first encoded parts of the encoded parts distributed to a first network equipment of the respective network equipment is insufficient to reconstitute an entirety of the encoded parts without a contribution of second encoded parts of the encoded parts distributed to a second network equipment of the respective network equipment, and wherein each of the first encoded parts are each associated with a first group of disparate account identities and each of the second encoded parts are each associated with a second group of disparate account identities.

2. The system of claim 1, wherein the encoded parts are respective encoded parts, and wherein the storing of the encoded parts comprises distributing the respective encoded parts to the respective network equipment of the different cloud service providers.

3. The system of claim 1, wherein the operations further comprise receiving a query for the sensitive data from another system, and, in response to receiving the query, obtaining the encoded parts from the respective network equipment of the different cloud service providers, performing inverse network coding on the different encoded parts to obtain reconstituted sensitive data, and returning the reconstituted sensitive data to the other system.

4. The system of claim 1, wherein the sensitive data is received as encrypted data.

5. The system of claim 1, wherein the sensitive data comprises at least one of: medical information or financial information.

6. The system of claim 1, wherein the encoding and the partitioning of the sensitive data comprises encoding the sensitive data into recovery groups of multiple fragments, in which one fragment of a recovery group is usable to recover another fragment of the recovery group, and wherein the storing of the encoded parts comprises distributing the multiple fragments to the respective network equipment of the different cloud service providers for storage.

7. The system of claim 6, wherein the recovery groups of the multiple fragments comprise at least one of: redundant fragments, or erasure coding fragments.

8. The system of claim 6, wherein the operations further comprise separating the fragments of each recovery group into multiple storage groupings, in which each storage grouping contains at least one fragment from each of at least two distinct recovery groups, and wherein the distributing of the multiple fragments comprises distributing the multiple storage groupings to the respective network equipment of the different cloud service providers for storage.

9. The system of claim 8, wherein the operations further comprise receiving a query for the sensitive data, and, in response to receiving the query, attempting to obtain the encoded parts based on the fragments in the multiple storage groupings, determining that one of the multiple storage groupings is unavailable from first network equipment of a first cloud service provider of the respective network equipment of the different cloud service providers, resulting in a missing fragment, and, in response to the determining that one of the storage groupings is unavailable, recovering the missing fragment from a storage grouping of second network equipment of a second cloud service provider of the respective network equipment of the different cloud service providers from which the missing fragment is recoverable.

10. The system of claim 1, wherein the operations further comprise re-encrypting the sensitive data via a proxy re-encryption service prior to the encoding and the partitioning of the sensitive data.

11. The system of claim 1, wherein the operations further comprise re-encrypting the encoded parts into re-encrypted encoded parts via a proxy re-encryption service prior to storing the re-encrypted encoded parts as the encoded parts.

12. The system of claim 11, wherein the operations further comprise receiving a query for the sensitive data, and in response to receiving the query, obtaining the encoded parts from the respective network equipment of the different cloud service providers, performing inverse network coding on the different encoded parts to obtain reconstituted and re-encrypted data, and returning the reconstituted re-encrypted data as the sensitive data.

13. A method, comprising:

obtaining, by a system comprising at least one processor, encrypted data;

performing, by the system, linear network coding to partition the encrypted data into encoded fragments;

distributing, by the system, the encoded fragments among respective network equipment of different cloud storage providers for storage, wherein the distributing of the encoded fragments ensures that first encoded fragments of the encoded fragments distributed to a first network equipment of the respective network equipment is insufficient to reconstitute an entirety of the encoded fragments without a contribution of second encoded fragments of the encoded fragments distributed to a second network equipment of the respective network equipment, and wherein each of the first encoded fragments are associated with a first collection of disparate account identities and each of the second encoded fragments are associated with a second collection of disparate account identities;

receiving, by the system, a request for the encrypted data; and in response to receiving the request, obtaining, by the system, from the respective network equipment of the different cloud storage providers, the encoded fragments;

reconstituting, by the system, the encoded fragments into the encrypted data; and returning, by the system, the encrypted data.

14. The method of claim 13, wherein the encoded fragments are re-encrypted by a proxy re-encryption service as re-encrypted encoded fragments, and wherein the reconstituting of the encoded fragments into the encrypted data comprises reconstituting, by the system, the re-encrypted encoded fragments into the encrypted data as re-encrypted encrypted data for returning in response to receiving the request.

15. The method of claim 13, wherein the encoded fragments comprise recovery groups comprising a first fragment and a second fragment, wherein the first fragment is recoverable from the second fragment, and wherein the distributing of the encoded fragments comprises separating, by the system, the first fragment from the second fragment to send the first fragment to first network equipment of a first cloud storage provider for storage, and to send the second fragment to second network equipment of a second cloud storage provider, that is different from the first network equipment of the first cloud storage provider, for storage.

16. The method of claim 15, wherein the reconstituting of the encoded fragments into the encrypted data comprises recovering, by the system, the first fragment from the second fragment.

17. A non-transitory machine-readable medium, comprising executable instructions that, when executed by at least one processor, facilitate performance of operations, the operations comprising:

obtaining encrypted data;

performing reversible coding to partition the encrypted data into encoded fragments; and distributing the encoded fragments among respective network equipment of the different cloud storage providers for storage, wherein the distributing of the encoded fragments ensures that first encoded fragments of the encoded fragments distributed to a first network equipment of the respective network equipment is insufficient to reconstitute an entirety of the encoded fragments without a contribution of second encoded fragments of the encoded fragments distributed to a second network equipment of the respective network equipment, and wherein each of the first encoded fragments are associated with a first grouping of disparate account identities and each of the second encoded fragments are associated with a second grouping of disparate account identities.

18. The non-transitory machine-readable medium of claim 17, wherein the encoded fragments are re-encrypted by a proxy re-encryption service as re-encrypted encoded fragments, and wherein a reconstituting of the encoded fragments into the encrypted data comprises reconstituting the re-encrypted encoded fragments into the encrypted data as re-encrypted encrypted data for returning in response to a request.

19. The non-transitory machine-readable medium of claim 17, wherein the operations further comprise receiving a request for the encrypted data, and, in response to the request, obtaining, from the respective network equipment of the different cloud storage providers, the encoded fragments, reconstituting the encoded fragments into the encrypted data, and returning the encrypted data.

20. The non-transitory machine-readable medium of claim 19, wherein the encoded fragments comprise recovery groups comprising a first fragment and a second fragment, wherein the first fragment is recoverable based on the second fragment, wherein the distributing of the encoded fragments comprises separating the first fragment from the second fragment to send the first fragment to first network equipment of a first cloud storage provider for storage, and to send the second fragment to second network equipment of a second cloud storage provider, that is different from the first cloud storage provider, for storage, and wherein the reconstituting of the encoded fragments into the encrypted data comprises recovering the first fragment based on the second fragment.

* * * * *